(12) United States Patent
Le Biez et al.

(10) Patent No.: US 6,881,029 B2
(45) Date of Patent: Apr. 19, 2005

(54) CASING, A COMPRESSOR, A TURBINE, AND A COMBUSTION TURBINE ENGINE INCLUDING SUCH A CASING

(75) Inventors: Philippe Le Biez, Draveil (FR); Yann Lebret, Maincy (FR); Claude Mons, Savigny le Temple (FR)

(73) Assignee: SNECMA Moteurs, Paris (FR)

( * ) Notice: Subject to any disclaimer, the term of this patent is extended or adjusted under 35 U.S.C. 154(b) by 75 days.

(21) Appl. No.: 10/681,265

(22) Filed: Oct. 9, 2003

(65) Prior Publication Data

US 2005/0058541 A1 Mar. 17, 2005

(30) Foreign Application Priority Data

Oct. 22, 2002 (FR) .......................................... 02 13144

(51) Int. Cl.⁷ ............................................... F01D 11/08
(52) U.S. Cl. .................................... 415/173.4; 415/119
(58) Field of Search .......................... 415/173.4, 174.4, 415/119, 914, 9.55–57.4, 173.1–6

(56) References Cited

U.S. PATENT DOCUMENTS

| 3,425,665 | A |   | 2/1969 | Lingwood |
| 3,867,061 | A | * | 2/1975 | Moskowitz ............... 415/173.3 |
| 4,639,388 | A | * | 1/1987 | Ainsworth et al. ......... 428/117 |
| 5,161,942 | A |   | 11/1992 | Chen et al. |
| 5,520,508 | A | * | 5/1996 | Khalid ........................ 415/119 |
| 6,159,578 | A | * | 12/2000 | Ichikawa ..................... 428/118 |
| 6,203,927 | B1 | * | 3/2001 | Subramanian et al. ....... 428/623 |
| 6,485,025 | B1 | * | 11/2002 | Hammersley et al. ....... 277/414 |

FOREIGN PATENT DOCUMENTS

| DE | 10 22 745 |     | 1/1958 |
| EP | 0 716 218 | A1 | 6/1996 |
| FR | 1 533 120 |     | 7/1968 |

* cited by examiner

*Primary Examiner*—F. Daniel Lopez
*Assistant Examiner*—James M. McAleenan
(74) *Attorney, Agent, or Firm*—Oblon, Spivak, McClelland, Maier & Neustadt, P.C.

(57) ABSTRACT

The casing of the invention is of the type supporting series of stationary blades having disposed between them series of blades that are movable in rotation about a longitudinal axis. In characteristic manner, said casing comprises a main element and, at least facing one of the series of moving blades, an assembly comprising a plate made of a honeycomb material and a covering disposed on the face of the plate facing away from the blades so that said cells are open towards the blades, said covering being provided with holes that open out into cells of the plate, thereby forming open cells, said covering closing other cells of the plate, thereby forming closed cells, a cavity being formed between said plate and the inside face of said main element. Preferably, the casing forms the casing of an axial compressor operating at low pressure in a turbojet engine.

11 Claims, 3 Drawing Sheets

CASING, A COMPRESSOR, A TURBINE, AND A COMBUSTION TURBINE ENGINE INCLUDING SUCH A CASING

The invention relates to a casing supporting a series of stationary blades between which there are disposed series of moving blades rotatable about a longitudinal axis, the radially outer ends of said moving blades being close to the inside face of the casing, in particular a casing used for an aviation turbojet engine.

The invention also relates to making a compressor, in particular of the axial type, specifically a compressor operating at low pressure and including a casing as mentioned above.

BACKGROUND OF THE INVENTION

Compressors of this type are used in particular in turbojet engines and are constituted by a rotor comprising either a succession of separate disks that are stacked one after another, or else a single drum designed to receive the series of blades constituting the various stages.

Conventionally, the rotor includes recesses or retention grooves that are made by machining in order to form spaces between pairs of adjacent stages in which the blades of the stator stages are received, the blades being secured to a stationary portion presenting a casing.

The casing forms a segment of the radially outer boundary of the filament of flow along which air flows through the turbomachine.

In conventional manner, the moving blades are secured individually to the drum via housings that are regularly distributed and equal in number to the blades, the shape of the housings being determined so as to cooperate with the roots of the blades by being complementary in shape, thereby ensuring that the blades are held radially, e.g. by a fastening of the dovetail type. To hold each blade root in translation relative to its housing, in particular in an axial direction, each blade is usually held individually by a system involving a ball, a pin, a staple, a flange, a spacer, etc.

While a turbojet engine is in operation, in particular with present-day civilian engines, and given the temperatures and pressures that are reached by the hot air, it is necessary to provide a regulation function in the event of surging.

Surging is a phenomenon within the engine that should be avoided since it involves sudden oscillations in air pressure or air flow rate, thereby subjecting the blades to considerable levels of mechanical stress that can cause them to be weakened or even broken. This phenomenon occurs in particular at the blade tips, in the boundary layer of air that is present between the blade tips and the casing, and it gives rise to local pockets of reduced pressure, leading to the so-called "cavitation" phenomenon.

At present, this function of regulating surging is provided by bleed or unloader valves which enable this boundary layer to be sucked away, thereby degrading engine rating, while also serving to evacuate water and/or ice that might have penetrated into the engine, in particular with compressors operating at high pressure. Nevertheless, such bleed or unloader valves are relatively expensive and fragile, and require an electrical power supply and strict maintenance.

Proposals have also been made to pierce the casing so as to form controlled leaks: nevertheless, that solution is very harmful in terms of energy efficiency since it puts the air stream directly into communication with the outside of the filament of flow.

OBJECTS AND SUMMARY OF THE INVENTION

An object of the present invention is to provide a casing enabling the use of bleed or unloader valves to be avoided or minimized, while nevertheless avoiding excessive energy loss.

An object of the invention is thus to enable the surging phenomenon to be reduced locally by increasing the present surging margin, but without reducing the efficiency of the engine.

To this end, according to the present invention, the casing comprises a main element and, at least facing one of the series of moving blades, an assembly comprising a plate made of a cellular material having tubular cells (or honeycombs) and a covering disposed on the face of the plate facing away from the blades so that said cells are open towards the blades, said covering being provided with holes that open out into cells of the plate, thereby forming open cells, said covering closing other cells of the plate, thereby forming closed cells, a cavity being formed between said plate and the inside face of said main element.

In this way, it will be understood that the presence of the open cells in the honeycomb plate, a structure which is light in weight and strong, enables air to be evacuated from the boundary layer into the cavity so as to avoid the surging phenomenon. Such an arrangement is also easy to implement because of the adaptability of honeycomb plates and the ease with which they can be mounted.

This solution also presents the additional advantage whereby the presence of the cavity situated between said plate and the inside face of said main element, makes it possible to establish recirculation of said compressed air taken from the boundary layer facing and/or downstream from a stage of blades, thus making it possible firstly to limit the leakage rate and secondly to increase the pressure upstream from a stage of blades.

Overall, this arrangement of the present invention makes it possible to suck in the boundary layer that is liable to lead to the surging phenomenon, without degrading engine rating because the above-mentioned air is recirculated, thereby making it possible to improve the stability of the system whose rating is close to the optimum operating line.

Preferably, said assembly further comprises a sheet of metal pierced by orifices situated between said covering and said inside face of said main element, said cavity being formed between said sheet and said inside face of said main element, at least some of said orifices being situated in line with the open cells.

This sheet of pierced metal contributes to directing the flow of air taken from the boundary layer and reinjected further upstream; it also serves to limit turbulence in the cavity and thus to improve noise performance.

Preferably, all of said cells are oriented in the same main direction which is either perpendicular to said longitudinal axis or which forms an acute angle relative to said longitudinal axis measured in the direction opposite to the flow direction of the fluid, and in particular of the air.

Such an angle serves to modify and thus control the conditions under which compressed air is taken and recirculated by means of a cellular structure oriented in a counterflow direction.

In another disposition that is preferred, at least some of said open cells are situated upstream and others are situated downstream from said series of moving blades: this guarantees recirculation of the boundary layer situated downstream from the wheel (series of moving blades) whose behavior is to be improved. This disposition may be combined with the possibility of placing open cells also in the segment extending the series of moving blades under consideration and/or other series of moving blades.

In a preferred embodiment, at least some of the closed cells in said plate are filled with a wear material: this solution adds an "abradable" characteristic to the plate. Thus, said assembly of the casing of the present invention serves also to perform the function of being "abradable" by the tips of the blades, i.e. it corresponds to using a wear material suitable for being removed or eroded, i.e. it is worn away by friction against the tips of the blades.

Preferably said wear material contains one of the substances belonging to the group formed by: resins, silicones, silicone resins.

In another disposition that can be combined with the disposition of the preceding paragraph, said wear material contains hollow beads, in particular glass beads.

The present invention also provides a compressor, preferably an axial compressor, in particular a low pressure compressor that has as its stator a casing as defined above.

The present invention also provides a combustion turboshaft engine, in particular a turbojet engine, including a compressor of the above-specified type.

Finally, the present invention also provides a turbine including a casing of the above-specified type.

BRIEF DESCRIPTION OF THE DRAWINGS

Other advantages and characteristics of the invention appear on reading the following description made by way of example and with reference to the accompanying drawings, in which.

MORE DETAILED DESCRIPTION

Figure 1:
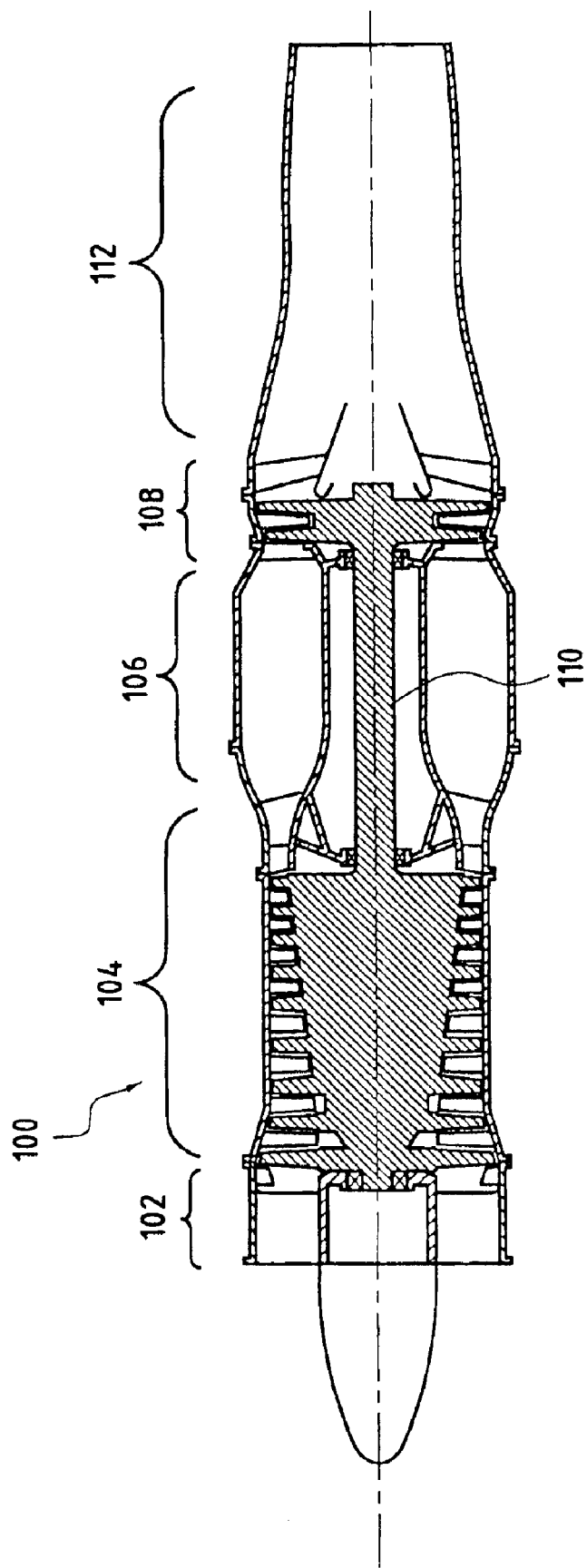
FIG. 1 is a diagrammatic longitudinal section view of a turbojet engine.

As can be seen in FIG. 1 which is a diagram of an axial turbojet engine 100 with its moving parts shaded, the main members of the turbojet engine comprise, from the upstream end to the downstream end: a fan 102, a compressor 104, a combustion chamber 106, a turbine 108 fitted with its shaft 110, and an exhaust duct 112.

Figure 2:
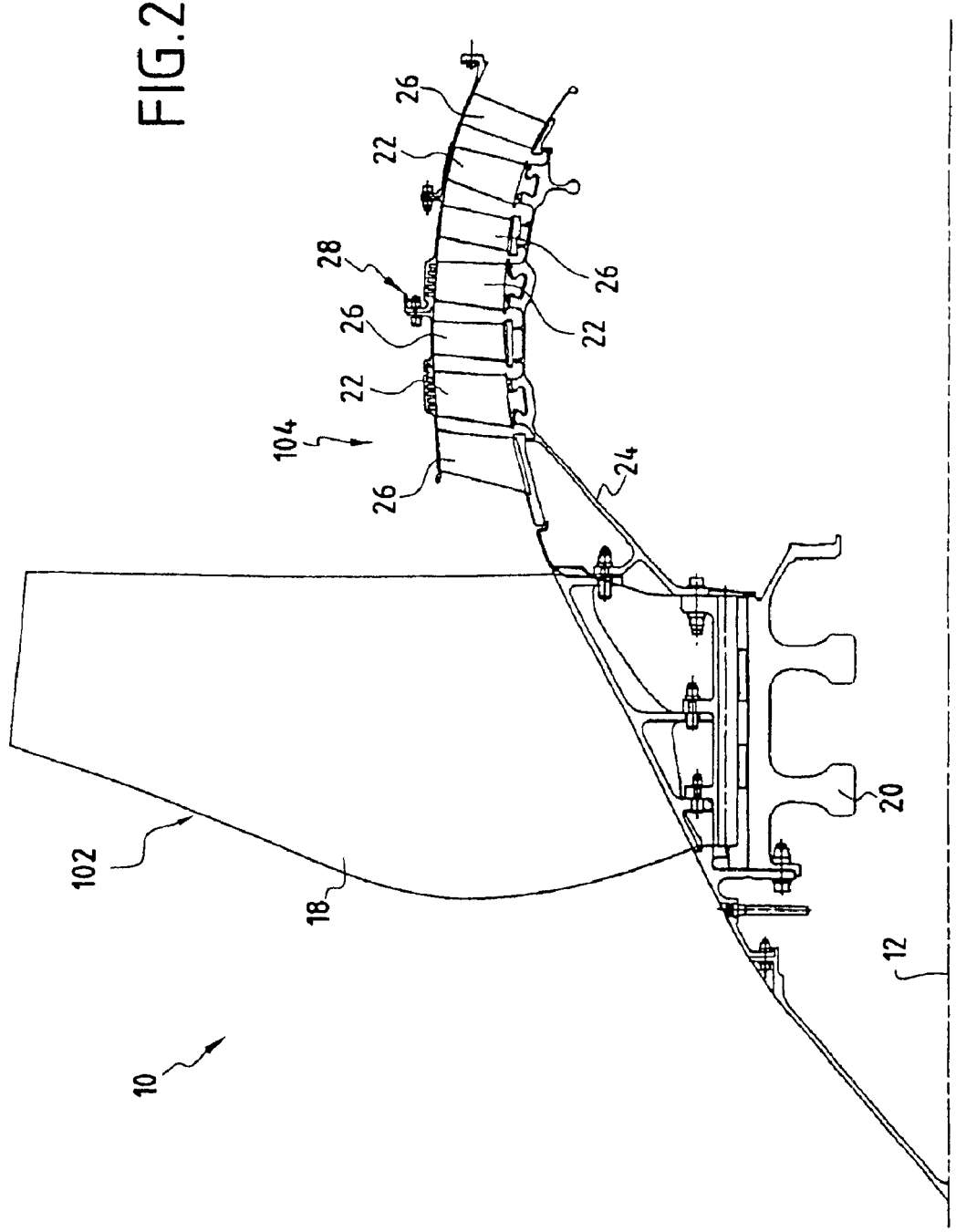
FIG. 2 is a half-view in fragmentary section of the front portion of a turbojet engine, showing the fan and a low pressure compressor fitted with a casing of the present invention.

FIG. 2 shows a portion of FIG. 1 on a larger scale.

More precisely, FIG. 2 is a section through half of the front portion 10 of a turbojet engine of the same kind as shown in FIG. 1, this half being situated on one side of the longitudinal axis 12 forming the axis of symmetry about which various elements rotate, in particular the various moving elements of the turbojet engine.

More precisely, amongst the various elements disposed axially around the longitudinal axis 12 and forming the conventional structure of such a turbojet engine, FIG. 2 shows the fan 102 and the compressor 104 that operates at low pressure.

The fan 102 comprises a series of blades 18 extending radially and mounted on an annular disk 20: only one of these blades 18 is shown in FIG. 2. Naturally, the disk 20 and the blades 18 are mounted to rotate about the longitudinal axis 12 of the turbojet engine.

In FIG. 2, the flow direction of the air stream defines an upstream direction (left-hand side of FIG. 1) of the downstream portion (right-hand side of FIG. 1).

It should be understood that for reasons of clarity other conventional elements of such a turbojet engine have been omitted, and in particular the elements that are situated downstream from the compressor 104 and the elements situated radially further out from the longitudinal axis 12.

The compressor 104 comprises a plurality of series of blades 22 that are movable in rotation and that are mounted on a disk or drum 24 secured to the disk 20 of the fan 102.

In FIG. 2 there can be seen three series of moving blades 22 having five series of stationary blades 26 mounted between them, being mounted on a casing 28.

The structure of this casing 28 in accordance with the present invention is described below in greater detail with reference to FIGS. 3 to 5.

In general, the air flow direction is marked by an arrow 30, while arrow 32 shows the direction of rotation of the blades 22 of the compressor 104.

The casing 28 comprises a main element 34 forming the load-carrying structure of the casing 28 and separating the air flow section (filament of flow) from the outside: this main element 34 thus corresponds essentially to the form of a conventional prior art casing.

The main element 34 has annular grooves 36 disposed facing each of the series of blades 22 that is to be treated.

Figure 3:
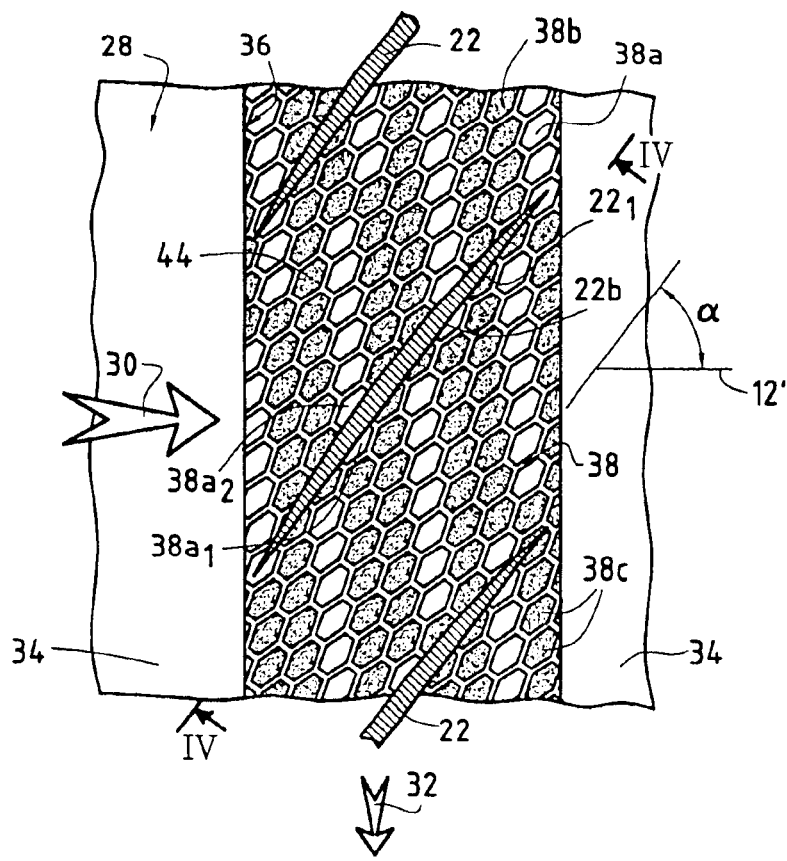
FIG. 3 is a plan view of a segment of the casing of the present invention with the free ends of the blades shown in cross-section.

As can be seen in FIG. 3, the length of these annular grooves 36 in the direction of the longitudinal axis 12 is slightly greater than the length of the blades 22 along said longitudinal axis 12 (FIG. 3 shows an axis 12, which is parallel to the longitudinal axis 12 of FIG. 2).

The annular groove 36 serves as a housing for an assembly comprising a plate 38 made of cellular material having tubular cells (honeycomb made from expanded sheets that are stuck to one another), a covering 40 forming a skin placed on the face of the plate 38 that faces away from the blades 22, and a metal sheet 42 disposed between the covering 40 of the plate 38 and the bottom of the annular groove 36.

The covering 40 has holes 40a placed in line with some of the cells of the plate 38 which thus constitute open cells 38a. However, not all of the cells in the plate 38 are open at their bottom ends in the plate 38 via holes 40a, so there remain closed cells 38b, as well.

The closed cells 38b are closed by the covering 40 at their ends facing away from the blades 22, while their ends facing towards the blades 22 are open.

Figure 5:
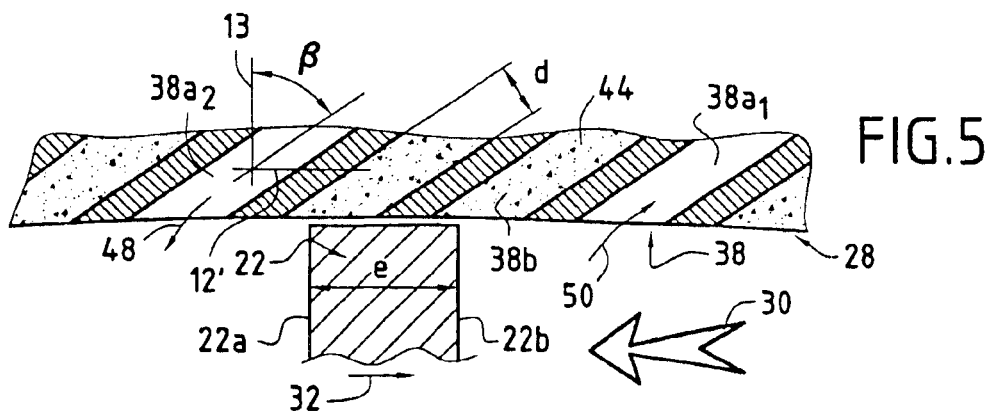
FIG. 5 is on a larger scale and shows the free end of a blade and the adjacent portion of the casing of the present invention.

Advantageously, the closed cells 38b are lined with a wear material 44 thus enabling the plate 38 to act as an abradable element, i.e. an element which is worn away or removed by the free ends of the blades 22, where appropriate (see FIG. 5).

Figure 4:
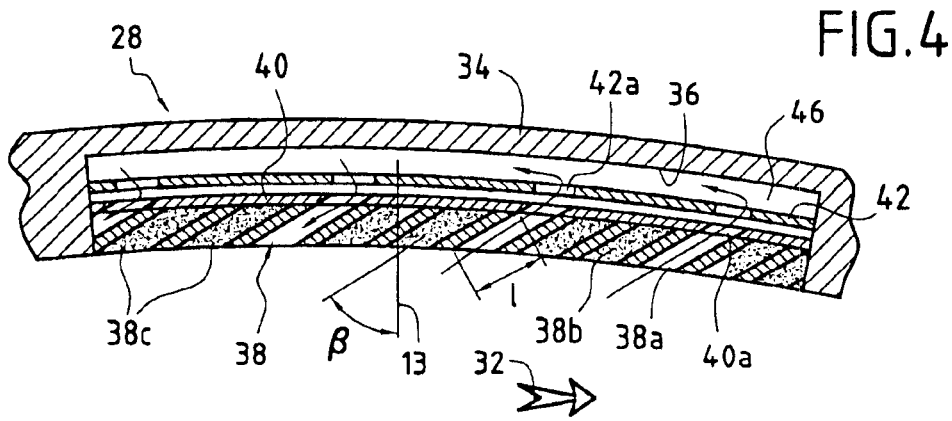
FIG. 4 is a section view on line IV—IV of FIG. 3.

As can be seen also in FIG. 4, the metal sheet 42 is pierced by orifices 42a situated in line with the holes 40a in the covering 40. Nevertheless, the position, the distribution, and the frequency of the orifices 42a can be modified so that the pierced metal sheet 22 contributes to improving noise or acoustic performance.

As can be seen in FIG. 4, the above-described arrangement leads to a dead cavity 46 being formed between the bottom of the groove 36 and the metal sheet 42, which cavity performs an air recirculation function as described in greater detail below.

The plate 38 thus has rows 38c of cells 38a, 38b, one of these rows 38c being visible in section in FIG. 4. These rows of cells 38c are oriented in such a manner as to form an angle α with the axis 12' parallel to the longitudinal axis 12.

This angle α which is advantageously acute may lie in the range 0° to 90°, and preferably in the range 15° to 45°, and it is preferably substantially equal to 30°. This angle α is selected to be close to the section setting angle, i.e. the angle formed between the longitudinal axis 12 (axis of rotation of the turbojet engine) and a straight line situated at the tip of a blade and passing through its leading edge and its trailing edge.

The cells 38a, 38b of the plate 38 are also inclined at an angle β relative to a normal axis 13 which is orthogonal to the longitudinal axis 12 and parallel to a radial or transverse plane of the compressor 104.

This angle β may lie in the range −90° to +90° (for circumferential grooving), and it depends on the speed vector at the tip of the blade.

As can be seen in FIG. 3, the cells 38a, 38b are hexagonal in section, however it should be understood that other shapes could naturally be used including: rectangular, flexible, multiple wave, reinforced hexagonal, cylindrical, sinusoidal, square, cruciform, offset hexagonal, and stiffened square (see in particular page 7 of French standard PR L 19-000 relating to an overall view of cellular materials having tubular cells for use in the fields of aviation and space).

In conventional manner, the sheets used for making the honeycomb plate 38 are made of aluminum alloy, titanium alloy, steel, or other metals, or indeed out of a non-metallic composite material.

It is preferable to use a plate 38 made of aluminum alloy or out of "Nomex" (registered trademark), i.e. a temperature-stable aramid textile fiber constituted by poly (metaphenylene isophthalamide).

The length l of the cells 38a, 38b may also be modified as a function of the result that it is desired to obtain. It should be understood that the dead cavity 46 enables air to recirculate corresponding to air inlet and outlet via the channels constituted by the open cells 38a.

In particular, as can be seen in FIG. 5, during rotation of the blades 22, the free tips of the blades 22 sweep over the various cells of the plate 38, thereby exposing the open cells 38a to pressure conditions that differ depending on the position of each blade 22. Thus, in FIG. 5, the face 22a of the blade 22 corresponds to its low pressure side, while the face 22b corresponds to its side that is subjected to a higher pressure, with arrow 32 indicating the direction of rotation of the blade 22.

For example, if consideration is given to the open cell $38a_1$ and the blade 22, shown in FIG. 3, in a position corresponding to an initial position, the open cell $38a_1$ is situated on the high pressure side 22b of the blade $22_1$, however as the blade advances in rotation in the direction of arrow 32, the open cell $38a_1$ will subsequently be subjected to pressure corresponding to the low pressure of the face 22a corresponding to the subsequent position of the blade $22_1$ and, as was the blade $38a_1$ when the blade $22_1$ was in its initial position.

Thus, as shown in FIG. 5, the open cell $38a_2$ that was initially subjected to pressure corresponding to the high pressure side 22b of the blade 22 generates a kind of air jet (arrow 48) beside the face 22a subjected to low pressure of the blade 22 when the blade passes over said cell $38a_2$, because of the previous entry of a flow of air (arrow 50) beside the face 22b of the blade 22 that is subjected to high pressure.

The same phenomenon will occur in the open cell $38a_1$ in which, in the initial position shown in FIG. 5, air penetrates (arrow 50) since this open cell $38a_1$ is located beside the face 22b of the blade that is subjected to high pressure.

Amongst the other parameters that can be modified, it should be observed that the mean dimension d (see FIG. 5) of the section of the cells 38a, 38b is preferably substantially equal to the thickness e of the blades 22.

The length l of the cells in the plate 38 is preferably not less than the dimension d, and preferably lies in the range two to ten times said dimension d.

In this way, it will be understood that the surging phenomenon is prevented by bleeding off a portion of the air contained in the boundary layer situated between the free tip of each blade 22 and the plate 38 because of the recirculation of air (arrows 50 and 48) as described above.

In this way, it will be understood that air leakage at the tip of the blade is not lost but is reinjected so that there is no loss of efficiency and it is possible to speak of controlled leaks serving to regulate surging conditions.

Concerning the "abradable" property, the wear material 44 may be constituted by a multitude of different materials amongst which the preferred materials belong to the group formed by: resins, silicones, silicone resins, advantageously with added hollow beads, in particular glass beads.

Resins filled with glass beads can be used, such as the resin known as "Minnesota Ec 3524". Silicone resins filled with hollow glass beads include, in particular, a resin known as "RTV 147/148".

In FIG. 3, for each row 38c of cells 38a, 38b, there is one open cell 38a every three cells, however other distributions could also be used.

Similarly, in FIG. 3, an offset is shown between the positions of the open cells 38a and the closed cells 38b once every seven rows of cells 38c, however other dispositions could also be selected.

The following parameters are available for optimizing the treatment performed by the casing 28: density of cells 38a, 38b in the plate 38; stretched shape of the cells (the shape of their section); the angle formed relative to the flow section (associated with the angle β); the ratio between the number of open cells 38a over the number of closed cells 38b; the position and orientation of the open cells and the closed cells; the section size of the open cells 38a and the positions selected for the open cells 38a relative to the closed cells 38b; the thickness of the honeycomb plate 38;

It should also be observed that the positioning of an assembly 38, 40, 42 in a groove 36 can be extended to one or more series of blades 22, to adjacent series of blades, or to certain series of blades, only.

Provision can also be made for the main element 38 to present a groove 36 over its entire length so that the entire compressor 104 and all of the series of blades 22 contained therein are treated by a single assembly 38, 40, 42 enabling air to recirculate in each grid.

Finally, it can be seen from the above that in addition to its "abradable" property, the assembly 38, 40, 42 serves fundamentally to stabilize pressure conditions in the air boundary layer in the compressor 104.

In general, it will be understood that using a plate made of a cellular material having tubular cells (or honeycombs)

is easy and adaptable given all the possible kinds of material that can be used, and the shapes (inclination and section shape) and sizes (length and section size) possible for the cells.

What is claimed is:

1. A casing supporting series of stationary blades having disposed between them series of blades that are movable in rotation about a longitudinal axis, the radially outer ends of said moving blades being close to the inside face of the casing, the casing comprising a main element and, at least facing one of the series of moving blades, an assembly comprising a plate made of a cellular material having tubular cells (or honeycombs) and a covering disposed on the face of the plate facing away from the blades so that said cells are open towards the blades, said covering being provided with holes that open out into cells of the plate, thereby forming open cells, said covering closing other cells of the plate, thereby forming closed cells, a cavity being formed between said plate and the inside face of said main element.

2. A casing according to claim 1, wherein said assembly further comprises a sheet of metal pierced by orifices situated between said covering and said inside face of said main element, said cavity being formed between said sheet and said inside face of said main element, at least some of said orifices being situated in line with the open cells.

3. A casing according to claim 1, wherein said cells are oriented in a main direction forming an acute angle relative to said longitudinal axis and measured in the opposite direction to the flow.

4. A casing according to claim 3, wherein said angle lies in the range 0° to 90°, preferably in the range 15° to 45°, and is preferably substantially equal to 30°.

5. A casing according to claim 1, wherein at least some of said open cells are situated upstream and others are situated downstream from said series of moving blades.

6. A casing according to claim 1, wherein at least some of the closed cells in said plate are filled with a wear material.

7. A casing according to claim 6, wherein said wear material contains a material selected from the group formed by: resins, silicones, and silicone resins.

8. A casing according to claim 6, wherein said wear material contains hollow beads, in particular glass beads.

9. An axial compressor, in particular a low pressure compressor, and including as its stator a casing according to claim 1.

10. A combustion turboshaft engine, in particular a turbojet engine, including a compressor according to claim 9.

11. A turbojet turbine including a casing according to claim 1.

* * * * *